Patented Nov. 1, 1949

2,486,812

UNITED STATES PATENT OFFICE 2,486,812

CERAMIC BODIES

Woldemar A. Weyl, State College, Pa., assignor to Monsanto Chemical Company, a corporation of Delaware No Drawing. Original application January 27, 1941, Serial No. 376,181. Divided and this application April 18, 1946, Serial No. 663,243

6 Claims. (Cl. 106—47)

This invention relates to an electrical insulating composition of the porcelain type having improved electrical and mechanical properties and to a novel glassy metaphosphate binder therefor.

Ceramic bodies of the porcelain type are usually made from three essential constituents:
1. Kaoline and clay ($Al_2O_3$, $SiO_2$, $H_2O$)
2. Flint ($SiO_2$)
3. Feldspar (potassium and sodium aluminum silicates).

The clay and flint together form the body of the ceramic mass and as this silica-alumina mixture has a very high sintering point, a flux is most generally added to form the matrix which bonds the particles together and also fills the voids in the mass producing a dense body of low porosity. The flux is usually feldspar which mineral always contains alkali. It has long been known that alkali metal compounds should preferably be absent or present only in minor amount in ceramic bodies used for electrical purposes, because of the tendency of these elements to ionize under electrical stresses.

My invention is accordingly directed to providing an alkali metal free, or substantially free, insulating body, and I accomplish this end by employing in my improved ceramic body as a binding agent a previously formed multicomponent trivalent metal phosphate glass. The metal phosphate glasses are first separately prepared in the form of a finely divided powder after which they are mixed with the other crystalline constituents such as the kaoline, clay, flint or other body in suitable proportions to effect the desired bonding action, and the plastic mass molded and fired in the usual manner.

The trivalent metal phosphate glasses which I have found suitable for use as a bond in my ceramic body are based principally upon aluminum or iron meta phosphates $R(PO_3)_3$ or mixtures thereof. The pure compounds may themselves be fused and cooled to produce glasses, however because of the high melting point of these pure compounds it is desirable that other oxides or phosphates be added thereto in order to lower the melting and therefore the glass forming temperature to a point in the neighborhood of 1350° C. Other trivalent metals which may form the basis of my multicomponent glasses are, boron and chromium, however, because of cheapness I prefer to employ iron or aluminum.

Of the oxides or phosphates which I may add to aluminum or iron metaphosphate glasses, in order to lower the melting temperature to the glass working range, I have found that certain other tri- and bivalent metal compounds such as boric oxide, magnesia, magnesium metaphosphate, calcium oxide or calcium metaphosphate, barium oxide or barium metaphosphate, and aluminum oxide, fluorspar, etc., are suitable additions. Combinations of these compounds with aluminum metaphosphate produces in a glass relatively low melting points, good glass forming properties and have a desirably low dielectric constant and low dielectric loss. For example I have prepared glasses of the following composition and properties based upon phosphorus pentoxide as the principal acidic constituent:

| No. | Glass Composition | Dielectric Constant |
|---|---|---|
| 1 | $Al(PO_3)_3$ 92%; $B_2O_3$ 8% | (low) |
| 2 | $Al(PO_3)_3$ 90%; $Mg(PO_3)_2$ 2%; $B_2O_3$ 8% | 4.15 |
| 3 | $Al(PO_3)_3$ 90%; $Ba(PO_3)_2$ 2%; $B_2O_3$ 8% | 3.75 |
| 4 | $Al(PO_3)_3$ 75%; $Ca(PO_3)_2$ 20%; $B_2O_3$ 5% | 5.1 |
| 5 | $Al(PO_3)_3$ 50%; $Mg(PO_3)_2$ 50% | 5.4 |
| 6 | $Al(PO_3)_3$ 60%; $Ba(PO_3)_2$ 35%; $B_2O_3$ 5% | 5.8 |
| 7 | $SiO_2$ (glass) (for comparison) | 3.7 |
| 8 | $SiO_2$ (Quartz) (for comparison) | 4.5 |

In general, variation may be made in the above glass compositions. For example I may vary the composition of the glass No. 1 between the limits $Al(PO_3)_3=95\%$, $B_2O_3=5\%$ and $Al(PO_3)_3=88\%$, $B_2O_3=12\%$. The composition $Al(PO_3)_3=92\%$, $B_2O_3=8\%$ gives the lowest melting point (glass forming temperature) in this system.

As an example of other systems of multicomponent glasses which I have found to be usable I give the following:

| No. | Glass Composition |
|---|---|
| 9 | $Al(PO_3)_3=65\%$, $Ca(PO_3)_2=35\%$ (which represents about the upper limit of aluminum metaphosphate possible in this combination, in order to insure easy melting) |
| 10 | $Al(PO_3)_3=90\%$, $Ca(PO_3)_2=2\%$, $B_2O_3=8\%$ |
| 11 | $Al(PO_3)_3=85\%$, $KPO_3=2.5\%$, $Mg(PO_3)_2=7.5\%$, $B_2O_3=5\%$ |
| 12 | $Al(PO_3)_3=60\%$, $Zn(PO_3)_2=35\%$, $B_2O_3=5\%$ |
| 13 | $Al(PO_3)_3=90\%$, $Zn(PO_3)_2=2\%$, $B_2O_3=8\%$ |
| 14 | $Al(PO_3)_3=57\%$, $SiO_2$ 11.4%, $P_2O_5=26.6\%$, $B_2O_3=5\%$ |
| 15 | $Al(PO_3)_3=82\%$, $SiO_2$ 5.4%, $P_2O_5=12.6\%$ |
| 16 | $Al(PO_3)_3=79\%$, $SiO_2$ 6.3%, $P_2O_5=14.7\%$ |
| 17 | $Al(PO_3)_3=80\%$, $SiO_2$ 15.0%, $B_2O_3=5\%$ |
| 18 | $Al(PO_3)_3=78\%$, $SiO_2$ 14.0%, $B_2O_3=8\%$ |

I may also produce suitable glasses based upon ferric metaphosphate $Fe(PO_3)_3$.

Suitable glasses based upon ferric metaphosphate may be made having the following compositions:

| No. | Glass Composition |
|---|---|
| 19 | $Fe(PO_3)_3=96\%$, $B_2O_3=4\%$ ($B_2O_3$ may be increased up to 18% and good glasses obtained) |
| 20 | $Fe(PO_3)_3=65\%$, $SiO_2=11.5\%$, $P_2O_5$ 23.5% |
| 21 | $Fe(PO_3)_3=55\%$, $SiO_2=13.5\%$, $P_2O_5$ 31.5% |

Glasses are more refractory with less $SiO_2$ and $P_2O_5$, but the following compositions still form a suitable glass:

| No. | Glass Composition |
|---|---|
| 22 | $Fe(PO_3)_3 = 85\%$, $SiO_2$ 5%, $P_2O_5$ 10% |
| 23 | $Fe(PO_3)_3 = 95\%$, $SiO_2$ 5% |
| 24 | $Fe(PO_3)_3 = 90\%$, $SiO_2$ 10% |

Glass may also be made using fluorspar as a flux. As examples I give:

| No. | Glass Composition |
|---|---|
| 25 | $Fe(PO_3)_3$, 98 to 96%, fluorspar 2% to 4%, glasses up to 15% fluorspar are clear |
| 26 | $Al(PO_3)_3 = 93\%$, fluorspar = 7% |
| 27 | $Al(PO_3)_3 = 93\%$, fluorspar 2%, $B_2O_3 = 5\%$ |

By "multicomponent phosphate glasses" as used in the specification and claims, I include those phosphate glasses which are based upon phosphoric anhydride as a principal component and which in addition contain one or more bi- or trivalent metallic elements present as the oxide or phosphate. There may also be present some quadrivalent elements such as silicon and titanium. It is also to be understood that easily ionizable elements such as the alkali metals are to be excluded to the extent and for the reasons already pointed out. These glasses are substantially water insoluble.

For producing my improved porcelain or chinaware body, I first prepare a multicomponent phosphate glass of a composition such as heretofore described which I then grind to a suitably fine state of subdivision. I then mix the finely divided glass with flint and clay in suitable proportions forming a raw batch suitable for refractory insulating bodies.

As an example I may use the following proportions:

| | Parts by weight |
|---|---|
| Flint | 50 to 60 |
| Kaolin (china clay) | 25 to 20 |
| Phosphate glass | 5 to 25 |

The flint, clay and glass mixture may then be ground in a ball mill employing flint pebbles and water and the resultant mass then filtered. The slabs of paste are removed from the filter press frames and stored until ready for use.

To produce the porcelain body the paste may be treated as in the ordinary chinaware manufacture by slip casting or it may be pressed, extruded or shaped on a wheel. It may be then fired and glazed as is usual and customary with this type of body. Upon firing the preformed phosphate glass bonds the crystalline particles of flint and clay together to produce the dense porcelain body in which the phosphate glass retains its essential glassy nature.

In place of flint and clay or even as an adjunct thereto, I may employ the crystalline mineral (or artificially produced) Steatite which is obtained by firing talc or soapstone alone or a modified Steatite obtained by firing talc or soapstone mixed with clay. Also included within the concept of my invention is the use of magnesium titanate which may be produced by the calcination of magnesium oxide and titanium oxide to produce compounds of the type:

$MgO.2TiO_2$; $MgO.TiO_2$; $2MgO.TiO_2$; $3MgO.2TiO_2$ which bodies have valuable electrical insulating properties.

This application is a division of application Serial No. 376,181, filed on January 27, 1941.

What I claim is:

1. A multicomponent metaphosphate glass resulting from the fusing together of from 85% to 98% by weight of $Fe(PO_3)_3$ and from 15% to 2% by weight of fluorspar.

2. A multicomponent metaphosphate glass resulting from the fusing together of 93% by weight of $Al(PO_3)_3$ and 7% by weight of fluorspar.

3. A multicomponent metaphosphate glass resulting from the fusing together of 93% by weight of $Al(PO_3)_3$, 2% by weight of fluorspar and 5% by weight of $B_2O_3$.

4. A multicomponent metaphosphate glass consisting of a fused mixture of a trivalent metal metaphosphate selected from the group consisting of $Al(PO_3)_3$ and $Fe(PO_3)_3$ and from 2% to 15% by weight of fluorspar which is effective to lower the glass forming temperature, said glass being substantially free of alkali metal compounds.

5. A multicomponent metaphosphate glass resulting from the fusing together of from 98% to 96% by weight of $Fe(PO_3)_3$ and from 2% to 4% by weight of fluorspar.

6. A fired ceramic body essentially comprising refractory materials bonded together in said body by means of a preformed multicomponent metaphosphate glass resulting from the fusing together of from 85% to 98% by weight of a trivalent metal metaphosphate selected from the group consisting of $Al(PO_3)_3$ and $Fe(PO_3)_3$ and from 15% to 2% by weight of fluorspar.

WOLDEMAR A. WEYL.

REFERENCES CITED

The following references are of record in the file of this patent:

UNITED STATES PATENTS

| Number | Name | Date |
|---|---|---|
| 1,570,202 | Buck | Jan. 19, 1926 |
| 2,194,784 | Berger | Mar. 26, 1940 |
| 2,278,501 | Tillyer et al. | Apr. 7, 1942 |
| 2,294,844 | Gelstharp | Sept. 1, 1942 |